United States Patent Office 3,594,116
Patented July 20, 1971

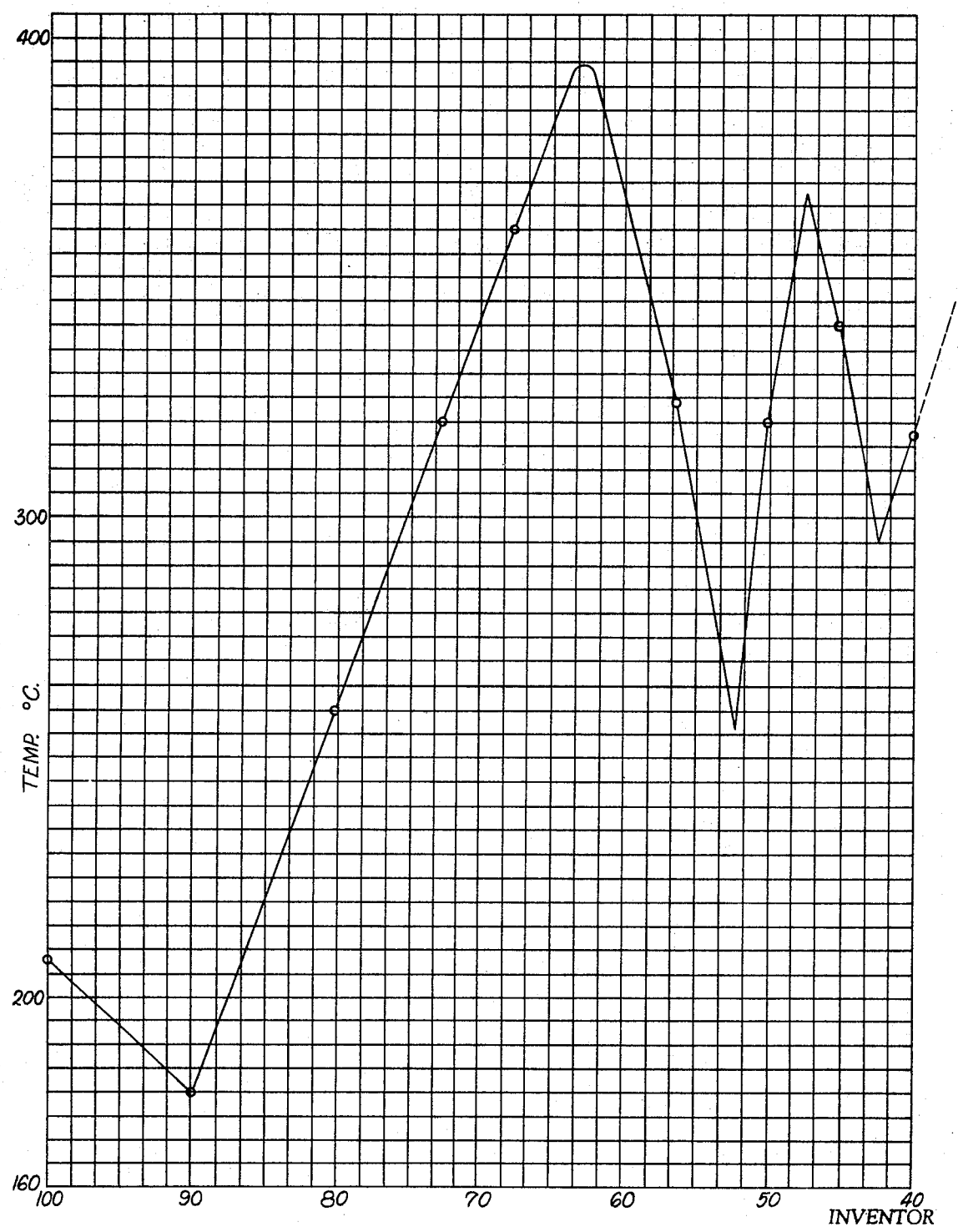

3,594,116
DITIN(II)ZIRCONIUM(IV)OCTAFLUORIDE OR TRIFLUOROZIRCONIUM PENTAFLUOROSTANNITE
John D. Donaldson, Richmond, England, assignor to Ozark-Mahoning Company, Tulsa, Okla.
Filed Nov. 22, 1968, Ser. No. 778,095
Int. Cl. C22b 59/00
U.S. Cl. 23—20     3 Claims

ABSTRACT OF THE DISCLOSURE

A new composition of matter comprising ditin(II)zirconium(IV)octafluoride (or trifluorozirconium pentafluorostannite having the formula $2SnF_2:ZrF_4$ and methods of preparing the said composition.

BACKGROUND OF THE INVENTION

The importance of tin(II) fluoride in dental preparations has been known for many years. The activity of this particular compound in providing protection to teeth against decay apparently stems from an action of both the fluorine and the tin species present. Stannous fluoride has been used in large quantities commercially as an additive to a caries-inhibiting toothpaste. It has also been widely used by dentists and dental hygienists in solution form for topical application to teeth to provide an enamel surface which is more resistant to decay than would otherwise be the case.

Even though stannous fluoride has been widely used and has been of great value in protecting teeth against decay, it is well known to be subject to some disadvantages. The tin(II) species which is formed when stannous fluoride is dissolved in water, is subject to oxidation and to hydrolysis, both changes reducing its anticaries activity. For topical applications, the solution must therefore be made just before use. In toothpastes, there may be also a slow diminution of activity because of changes in the stannous fluoride.

Recently, the compound named stannous hexafluorozirconate has been discovered and may be found to have some advantages over the simple stannous fluorides in dental applications in regard both to stability and lowered acidity in solution. Patent 3,337,295, issued Aug. 22, 1967 "Stannous Hexafluorozirconate" White et al., discloses methods of preparing stannous hexafluorozirconate, $SnZrF_6$. Patent 3,266,867, issued Aug. 16, 1966 to Joseph C. Muhler "Stannous Fluorozirconate ($SnZrF_6$)" discloses stannous fluorozirconate (tin(II)hexafluorozirconate) having the formula $SnZrF_6$. Muhler 3,266,996, issued Aug. 16, 1966 "Oral Compositions for Caries Prophylaxis Containing Stannous Fluorozirconate" discloses oral compositions, dentifrice compositions and a toothpaste with stannous fluorozirconate and further the method of reducing solubility of dental enamel utilizing stannous fluorozirconate in aqueous solution.

The most unusual feature of stannous hexafluorozirconate, $SnZrF_6$, is that high concentrations (such as up to 30%) can be used in the mouth in aqueous solution without the corrosive action characteristic of stannous fluoride solutions. In giving topical applications of stannous fluoride, care must be taken to prevent contact of the 4, 8 and 10% solutions with the gums and other oral tissues.

It has been supposed that the combination of tin and zirconium with fluorine, having the composition represented by the formula $SnZrF_6$, was the only compound between these three elements. I have now discovered, however, that a new and previously unrecognized compound can be produced wherein the ratio of the two salts, which might be considered parents, is $2SnF_2:ZrF_4$, whereas the so called "Stannous Florozirconate" disclosed in the Muhler patents, supra, is one mole $SnF_2$ to one mole of $ZrF_4$. i.e. ($SnF_2:ZrF_4$). Experimental evidence showing the difference of these two compounds is later herein presented.

I have studied the $SnF_2$–$FrF_4$ system, both in solution and in melts of the two salts, and discovered that in addition to a compound of ratio represented by the formula $SnF_2:ZrF_4$, there is a compound $2SnF_2.ZrF_4$. Furthermore, I have discovered by use of the Mossbauer effect that the tin in these combinations is present as a portion of the anionic moiety.

The $ZrF_4:2SnF_2$ composition has not previously been known.

The stannous hexafluorozirconate, $SnZrF_6$, has an advantage as stated above in that solutions are less corrosive to oral tissues than solutions of stannous fluoride of comparable tin and fluorine content. Therefore higher concentration and more effectively caries inhibiting solutions can be used for topical applications. In addition to this desirable characteristic of the stannous fluorozirconate, the mere presence of the zirconium adds to the caries-inhibiting potency, as zirconium fluoride alone has such activity. However the combination $SnZrF_6$ is subject to the known disadvantage that soluble zirconium compounds may occasionally give rise to granulomatous irritation of the gums or other oral tissues. The fact that I have halved the molar content of zirconium and doubled the molar content of tin(II) in the new composition tends to reduce considerably the appearance of this condition and at the same time retains the advantage which is properly attributed to the presence of the zirconium in tieing up the fluorine and in stabilizing the tin.

Salient facts are the following:

(1) There are two compounds obtainable from the $SnF_2:ZrF_4$ system; one is of the 1:1 molecular ratio and the other has two moles of $SnF_2$ to one of $ZrF_4$.

(2) Each of these compounds is recoverable from both a molten salt mixture and an aqueous solution mixture of the parent salts in the proper molecular ratios.

(3) The tin tends not to be in the cationic portion of the resulting molecules but is probably present largely in the form of ether the $SnF_3^-$ or $Sn_2F_5^-$ ions which are known to exist in tin(II)-fluoride solutions. Although we do not know the nature of the zirconium species, the salts could be trifluorozirconium trifluorostannite ($ZrF_3SnF_3$) and trifluorozirconium pentafluorodistannite ($ZrF_3Sn_2F^-$).

The principal difference between my new compound containing zirconium and simple stannous fluoride, per se, appears to be that a much higher concentration can be used in the mouth without discomfort to the patient from contacting the gums or other oral tissues with a solution. The corrosive action of stannous fluoride may be attributed to the stannous ion or to the acidity associated with it. An increase in the F:Sn ratio increases the stability of solutions containing these elements because more of the tin will be in the form of the stable $SnF_3^-$ or other complex tin-fluorine ions. In these solutions, then, we do not have significant quantities of the stannous ion and for that reason they are less noxious.

Still another object is to provide an improved method of reducing the solubility of dental enamel.

Yet another object of the invention is to clarify the true structure of the compound previously known as stannous fluorozirconate or stannous hexafluorozirconate.

Yet another object of the invention is to provide a new salt containing tin, fluorine and zirconium wherein relatively high concentrations thereof can be used in the mouth without the corrosive action characteristic of stannous fluoride solutions.

Another object of the invention is to provide a dental compound having double the amount of stannous fluoride as compared to the quantity in stannous hexafluorozirconate.

Other and further objects of the invention will appear in the course of the following description thereof.

THE COMPOUND

Evidence supporting the existence of the above noted previously unrecognized compound (which can be produced wherein the ratio of the two salts is $2SnF_2:ZrF_4$) may be found in the chemical analysis of solids obtained from solution when said solutions contain stannous fluoride and zirconium tetrafluoride in proper ratios and, as well, in chemical analysis of the solid formed by fusing a mixture of stannous fluoride and zirconium tetrafluoride in the ratio 2:1.

The single figure is a phase diagram of the $SnF_2^-:ZrF_4$ system extending from 100 mole percent $SnF_2$ and 0% $ZrF_4$ to 40% $SnF_2$ and 60% $ZrF_4$. This shows clearly the existence of the $2SnF_2^-:ZrF_4$ compound which has a congruent melting point of slightly over 394° C. And the $SnF_2:ZrF_4$ also appears at 50 mole percent $SnF_2$ and has a melting point slightly over 368° C. The diagram shows normal eutectic points between the $SnF_2:ZrF_4$ and $2SnF_2^-:ZrF_4$ and between the latter and $SnF_2$.

Table 1 is a table entitled "X-ray Diffraction Powder Data" and includes such data for $SnF_2$, $SnF_4$, $Sn_2ZrF_8$ and $SnZrF_6$ obtained with 1.64 cm. cameras and filtered copper K radiation. $Sn_2ZrF_8$ yields a distinctive X-ray diffraction pattern which is readily distinguishable from the patterns of tin(II) fluoride, zirconium(IV) fluoride and $SnZrF_6$. For example, the strongest lines in the data for $Sn_2ZrF_8$ correspond to interlayer spacings of 4.56, 3.40 and 2.09 A. compared to those of $SnF_2$, 3.54, 3.18, 2.05 and 1.77 A.; $ZrF_4$, 6.43, 3.99, 3.30 and 1.87 A.; and $SnZrF_6$, 8.04, 4.55 and 2.00 A.

PREPARATION OF $Sn_2ZrF_8$

Example 1: Preparation from solution

⅔ gram moles of stannous fluoride (104 grams) and 1.3 gram mole (55 grams) of zirconium tetrafluoride were added to 100 ml. of water. The mixture was stirred for 30 minutes at room temperature, then warmed to 40 degrees C. at which time the solids had all gone into solution to give a clear, somewhat brown solution. This solution was evaporated at about ⅔ of its original volume and then cooled to get a crop of crystals. These crystals were filtered off on a porcelain filter and later combined with a second batch which was obtained by further evaporation of the filtrate from this first batch. The second evaporation took the material to near dryness and the two products were combined and further dried in a vacuum desiccator. Except for some small amount of loss due to handling, the total of the stannous fluoride-zirconium tetrafluoride were combined in a product. The analysis of this was 30.15 percent F (31.63 percent is the calculated F content for $Sn_2ZrF_8$), 51.81 percent tin (49.39 percent calculated for the above formula) and by difference 18.04 percent Zr (18.98 percent is theoretical for the above formula).

Example 2: Preparation of fusing 34.7 grams (34.7) of $SnF_2$ and 18.3 grams of $ZrF_4$ were mixed in a graphite crucible, which was heated with a small gas flame until liquefaction started. The required temperature was only about 200 degrees centigrade. When the whole mass had liquefied, it was poured onto a Teflon sheet, then, when it had solidified, it was ground in a mortar. Analysis of the product was 28.96 F, 50.10 percent Sn and 20.94 percent Zr (by difference).

Both of these products were soluble in water.

In the melt preparation (Example 2) the molar ratios must be approximately correct. In the aqueous solution preparation, the molar ratio of $SnF_2:ZrF_4$ must be not less than 2:1 (in fact it is better to have a slight excess of $SnF_2$ to avoid any formation of $SnZrF_6$) but pure $Sn_2ZrF_8$ can be obtained from solutions with ratios up to $4SnF_2:1ZrF_4$.

EFFICACY

I find that DTZO (ditin(II)zirconium(IV)octafluoride) is effective in reducing tooth enamel solubility in vitro and also effective in reducing rat caries in vivo. The tests in vitro were run with DTZO contained in a practical dentifrice. The test dentifrices each contained $Ca_2P_2O_7$ abrasive and 1% $Sn_2P_2O_7$ tin reservoir. The three compositions contained stannous hexafluorozirconate, DTZO, and stannous fluoride, respectively, each of the concentration required to provide Sn(II) ion at 1000 p.p.m. in all dentifrices. The fluoride concentrations of all three were brought up to 1000 p.p.m. by addition of appropriate amounts of NaF. In this way, there were compared compositions of equal tin and fluoride levels for all three active compounds.

Measurements made on these dentifrices are summarized below. The $Sn^{++}$ values are parts of tin(II) per million parts of supernatant from a 1:3 dentifrice: water slurry. Tin(II) was determined by the standard titration with $KIO_3$. Similarly, the $F^-$ values are p.p.m. in a supernatant from a 1:3 slurry as determined by the TechnicoAutoAnalyzer Method. The "ESR" scores are the percentages of enamel solubility reduction in test described in U.S. Pat. 3,105,798.

DENTIFRICE IDENTIFICATION

RJG 186 _____ (1% $Sn_2P_2O_7$)+$SnZrF_6$ (Sn=1000 p.p.m., F=960 p.p.m.)+NaF (F=40 p.p.m.)
RJG 187 _____ (1% $Sn_2P_2O_7$)+$Sn_2ZrF_8$ (Sn=1000 p.p.m., F=640 p.p.m.)+NaF (F=360 p.p.m.)
RJG 188 _____ (1% $Sn_2P_2O_7$)+$SnF_2$ (Sn=1000 p.p.m., F=320 p.p.m.)+NaF (F=680 p.p.m.)

MEASUREMENTS OF AGED DENTIFRICES

| Dentifrice | 1 week | 1 month | 2 months | 4 months |
|---|---|---|---|---|
| $Sn^{++}$, p.p.m.: | | | | |
| 186 | 260 | 296 | 270 | 123 |
| 187 | 379 | 383 | 335 | 84 |
| 188 | 647 | 587 | 200 | 59 |
| $F^-$, p.p.m.: | | | | |
| 186 | 203 | 175 | 130 | 107 |
| 187 | 198 | 185 | 158 | 115 |
| 188 | 175 | 159 | 158 | 119 |
| ESR: | | | | |
| 186 | 65 | 62 | 64 | 50 |
| 187 | 60 | 73 | 59 | 43 |
| 188 | 69 | 64 | 47 | 32 |

The compound $Sn_2ZrF_8$ is apparently somewhat superior to $SnF_2$ in maintaining analyzable Sn(II) ion in the dentifrice slurry at ages of 2 months or greater, and its performance in the ESR test is also superior. ($SnZrF_6$ also appears to be superior to $SnF_2$ in this test.)

The rat-caries experiment was performed with solutions of $Sn_2ZrF_8$, $SnZrF_6$, and NaF, each with F=250 p.p.m. and no other salts added. In this test the solutions are swabbed onto the teeth of rats daily for a week. The animals are then sacrified, and a staining technique is used to disclose carious areas. Lower scores indicate greater reduction of caries.

Rat-caries scores:
NaF _____ 84.7
$Sn_2ZrF_8$ _____ 83.3
$Sn_2ZrF_6$ _____ 77.7

There are no significant differences among these scores. Experience with rat-caries also tells us that $SnF_2$ would not be significantly different from NaF under these particular experimental conditions. It is concluded, therefore, that $Sn_2ZrF_8$ is effective in reducing caries in the rat.

The specific gravity of DTZO is 4.35±0.05 g./ci.

X-RAY DIFFRACTION POWDER DATA
(TABLE I)

$ZrF_4$

| d, A. | Relative intensity |
|---|---|
| 8.43 | W |
| 6.43 | VVS Broad |
| 5.65 | VVW |
| 5.18 | W |
| 4.75 | VW |
| 4.31 | VVW |
| 4.12 | VVW |
| 3.99 | VVS |
| 3.83 | M |
| 3.58 | W |
| 3.45 | S |
| 3.30 | VVS |
| 3.20 | S |
| 3.08 | W |
| 2.90 | M |
| 2.74 | W |
| 2.58 | S |
| 2.48 | VVW |
| 2.43 | VVW |
| 2.37 | VW |
| 2.28 | VVW |
| 2.24 | M |
| 2.14 | VW |
| 2.09 | M |
| 2.05 | VVW |
| 1.99 | VVW |
| 1.93 | S |
| 1.87 | VS |
| 1.84 | W |
| 1.82 | M |
| 1.73 | S |
| 1.68 | M |
| 1.63 | M |
| 1.62 | M |
| 1.57 | MS |
| 1.52 | VW |

$SnF_2$

| d, A. | Relative intensity |
|---|---|
| 5.46 | VW |
| 4.45 | W |
| 3.88 | W |
| 3.54 | VS |
| 3.44 | S |
| 3.34 | S |
| 3.18 | VS |
| 3.11 | S |
| 2.74 | M |
| 2.59 | M |
| 2.52 | M |
| 2.44 | M |
| 2.35 | S |
| 2.30 | W |
| 2.21 | VW |
| 2.11 | M |
| 2.08 | S |
| 2.05 | VS |
| 1.98 | S |
| 1.95 | S |
| 1.93 | S |
| 1.88 | M |
| 1.85 | S |
| 1.79 | VW |
| 1.77 | VS |
| 1.74 | VW |
| 1.70 | VW |
| 1.69 | W |

$SnF_2$—Continued

| d, A. | Relative intensity |
|---|---|
| 1.62 | W |
| 1.61 | W |
| 1.59 | W |
| 1.57 | VW |
| 1.56 | VW |
| 1.53 | M |
| 1.50 | M |

$Sn_2ZrF_8$

| d, A. | Relative intensity |
|---|---|
| 7.94 | M |
| 5.32 | VW |
| 5.03 | W |
| 4.56 | S |
| 4.15 | VW |
| 4.01 | W |
| 3.54 | M |
| 3.42 | VVS |
| 3.40 | VVS |
| 3.31 | W |
| 3.20 | VS |
| 3.14 | VVW |
| 2.95 | S |
| 2.81 | W |
| 2.71 | W |
| 2.63 | VVW |
| 2.49 | VVW |
| 2.33 | VW |
| 2.23 | VVW |
| 2.10 | M |
| 2.09 | VVS |
| 2.07 | S |
| 2.00 | M |
| 1.93 | S |
| 1.86 | VVW |
| 1.78 | M |
| 1.74 | M |
| 1.71 | W |
| 1.66 | VVW |
| 1.54 | M |

$SnZrF_6$

| d, A. | Relative intensity |
|---|---|
| 8.04 | VS |
| 6.56 | VVW |
| 5.31 | S |
| 5.04 | S |
| 4.85 | M |
| 4.55 | VS |
| 4.32 | W |
| 4.13 | W |
| 4.00 | VS |
| 3.86 | W |
| 3.70 | W |
| 3.53 | W |
| 3.38 | S |
| 3.29 | M |
| 3.20 | M |
| 3.15 | W |
| 3.07 | W |
| 2.96 | M |
| 2.82 | VW |
| 2.77 | W |
| 2.71 | W |
| 2.61 | S |
| 2.50 | VW |
| 2.36 | M |
| 2.30 | VW |
| 2.15 | M |
| 2.09 | Broad M |
| 2.04 | VVW |

SnZrF$_6$—Continued

| $d$, A.: | Relative intensity |
|---|---|
| 2.00 | VS |
| 1.93 | Broad M |
| 1.87 | M |
| 1.86 | M |
| 1.84 | W |
| 1.80 | Broad M |
| 1.77 | Broad M |
| 1.75 | M |
| 1.72 | M |
| 1.70 | VW |
| 1.68 | M |
| 1.65 | VVW |
| 1.62 | Broad W |
| 1.56 | W |
| 1.54 | W |
| 1.52 | W |

Having thus described my invention, I claim:

1. Ditin(II)zirconium(IV)octafluoride (Sn$_2$ZrF$_8$).

2. A method of preparing ditin(II)zirconium(IV)octafluoride (Sn$_2$ZrF$_8$) comprising mixing stannous fluoride and zirconium tetrafluoride in the ratio of two moles to four moles of stannous fluoride to one of zirconium tetrafluoride in aqueous solution, dissolving same in said aqueous solution and crystallizing ditin(II)zirconium(IV) octafluoride (trifluorozirconium pentafluorostannite) therefrom by evaporation and cooling.

3. A method of preparing ditin(II)zirconium(IV)octafluoride (Sn$_2$ZrF$_8$) comprising mixing stannous fluoride and zirconium tetrafluoride together in crystalline form in a ratio of substantially two moles to one, heating same together until liquifaction of same, then solidifying and recovering ditin(II)zirconium(IV)octafluoride (trifluorozirconium pentafluorostannite) therefrom.

References Cited

UNITED STATES PATENTS 3,266,867    8/1966    Muhler _____ 23—51

OTHER REFERENCES

Donaldson et al., Journal of The Chemical Society (London), January 1964, pp. 271–275.

Donaldson et al., Journal of The Chemical Society (London), Sec. A, 1966, pp. 1798–1800.

Donaldson et al., Journal of The Chemical Society (London), Sec. A, 1967, pp. 1821–1825.

Thamer et al., Chemical Abstracts, vol. 53, November 1959, p. 21223(c).

HERBERT T. CARTER, Primary Examiner

U.S. Cl. X.R.

23—22, 51, 53, 88; 424—52